United States Patent [19]

Leman

[11] Patent Number: 5,199,849
[45] Date of Patent: Apr. 6, 1993

[54] HELICOPTER SWASHPLATE MOUNTED ON ARTICULATIONS UNCOULED IN PITCHING AND ROLLING

[75] Inventor: Jean-Luc Leman, Aix-en-Provence, France

[73] Assignee: Aerospatiale Societe Nationale Industrielle, Paris, France

[21] Appl. No.: 697,383

[22] Filed: May 9, 1991

[30] Foreign Application Priority Data

May 14, 1990 [FR] France .................. 90 06009

[51] Int. Cl.[5] .......................................... B64C 27/605
[52] U.S. Cl. ................................. 416/114; 416/134 A
[58] Field of Search .................. 416/98, 102, 112, 113, 416/114, 134 A, 168 R; 74/60; 244/17.25

[56] References Cited

FOREIGN PATENT DOCUMENTS 0162773 11/1985 European Pat. Off. .
2019335 7/1970 France .
2163395 2/1986 United Kingdom .

Primary Examiner—Edward K. Look
Assistant Examiner—James A. Larson
Attorney, Agent, or Firm—Nikaido Marmelstein Murray & Oram

[57] ABSTRACT

The control device is of the type including two annular disks (3,6), a rotating and non-rotating disk, assembled by at least one ball bearing (20) and mounted concentrically about the rotor shaft (1). The non-rotating disk (3) is mounted so as to oscillate with respect to the shaft (1) via a mechanism consisting of swivel/laminated articulations (2, 10). The mechanism for tilting, for axial displacement and for retention in rotation of the non-rotating disk includes two swivel joints (2) which are diametrically opposite on either side of the axis of rotation of the shaft (1) and are centered on the longitudinal tilting axis (A—A) of the non-rotating disk (3). Each swivel joint is retained between a disk support (5), which is mounted so as to slide parallel to the axis of the shaft (1) along a disk guide (4) which is itself coaxial with the shaft (1) and fixed about the latter, and an element (9) for fixing to the non-rotating disk (3). Tilting of this disk (3) about the lateral tilting axis (B—B) is permitted by two deformable linking assemblies with laminated blocks (10). Each linking assembly is arranged between the disk support (5) and a swivel joint (2).

19 Claims, 3 Drawing Sheets

HELICOPTER SWASHPLATE MOUNTED ON ARTICULATIONS UNCOUPLED IN PITCHING AND ROLLING

FIELD OF THE INVENTION

The present invention relates to devices for controlling the pitch of rotor blades, and concerns more precisely a device with cyclic disks mounted on articulations which are uncoupled in pitching and rolling, for controlling the collective or general pitch and the cyclic pitch of the blades of a rotorcraft rotor, and in particular of a main or lifting rotor of a helicopter.

More precisely, the subject of the invention is a device of this type in which the cyclic disks are, in particular, produced and mounted in a particular articulatory and sliding arrangement with respect to the shaft of a lifting or main rotor of a helicopter so as to control the collective and cyclic pitches of the blades of this rotor.

PRIOR ART

It is well known that variations in the lift force supplied by a main rotorcraft rotor are obtained by varying simultaneously, and in the same direction, the angle of attack of all the blades of this rotor (collective pitch control), and that the piloting of a rotorcraft in which the shaft of each lifting rotor is held in a fixed position on the structure of the rotorcraft is ensured by varying cyclically the pitch of the blades (cyclic pitch control) of this rotor or rotors.

In order to transmit the orders for controlling the collective pitch and the cyclic pitch to the blades of a rotor, it has already been proposed to use devices comprising two annular disks which are assembled by at least one ball bearing and are mounted concentrically about the shaft of the rotor, intended to be driven in rotation about its axis, and one of which is a non-rotating disk immobilized in rotation by at least one lower linking member fixed to at least one casing rigidly linked to the structure of the rotorcraft. The non-rotating disk is mounted, on the one hand, so as to be displaceable in axial translational motion along a fixed tubular disk guide coaxial with the rotor shaft and surrounding part of the latter and, on the other hand, so as to oscillate with respect to this rotor shaft about a longitudinal tilting axis and a lateral tilting axis of the disks, which are perpendicular to each other and in each case to the axis of rotation of the rotor shaft, via an articulation mechanism. The other disk is a rotating disk intended to be driven in rotation with the shaft of the rotor by at least one upper linking member fixed to the shaft and/or to the hub of the rotor. The rotating disk is connected to the pitch-control lever of each of the blades of the rotor by a pitch connecting rod, the non-rotating disk is urged by collective-pitch control members which control its displacements in translational motion along the disk guide, as well as by cyclic-pitch control members which control its oscillations with respect to the rotor shaft, with the result that the rotating disk, which follows the movements of the non-rotating disk, transmits these movements to the pitch-control levers of the blades via pitch connecting rods.

Collective-pitch control is thus obtained by axial translational motion of the disk assembly, which motion is ensured by axial sliding along the disk guide which surrounds the rotor shaft, and cyclic-pitch control is obtained by inclination of the disk assembly with respect to the axis of the rotor shaft by virtue of this articulation mechanism.

A control device of the abovementioned type is already known from French Patent 2,227,175, in which the driving in rotation of the rotating disk, and the centering, the tilting and the translational motion of the two disks with respect to the shaft of the rotor are obtained by two pairs of connecting rods in the form of suspension scissors or scissor link assemblies which are diametrically opposite of each pair and offset by 90° in the circumferential direction with respect to the scissor links of the other pair, each of the scissor link assemblies being articulated by way of a swivel joint at its outer end on the rotating disk, in a radially inner position with respect to the non-rotating disk. Two opposite scissor link assemblies of a pair are linked directly by their inner end to the rotor shaft, while the two other links are also linked to this rotor shaft by their inner end, but via a laminated elastomeric bearing which comprises an outer metal bearing surface joined to the corresponding scissor link assembly and a likewise metal, inner bearing surface joined to the rotor shaft. An elastomeric lining is placed in between these two bearing surfaces with a view to permitting, by its deformations in shear, an angular deviation with respect to the shaft in the plane of rotation of the rotating disk.

This device has the serious disadvantage of comprising rotary centering and drive members which are therefore stressed dynamically at the speed of rotation of the rotor, with the result that, when this rotor is significantly inclined, which corresponds to the most frequent operating situation since this is the cruise-flight configuration, the movements of the articulations of the scissor links are considerable and highly detrimental to good durability.

In French Patent 2,569,387, whose subject is a similar control device, similar functions of retaining in rotation the non-rotating disk with respect to a fixed element of the structure of the aerodyne, and of the centering, the tilting and the translational motion of the two disks are ensured by flexible and twistable radii or plates which are mounted, on the one hand, rigidly on the structure of the aerodyne and, on the other hand, on the non-rotating disk via a cylindrical/rectangular or spherical/rectangular laminated double bearing arranged at the end of each radius. These laminated linking bearings perform an entirely secondary role, to the extent that they are intended solely to permit the extension and the curving of the abovementioned flexible radii or plates when the non-rotating disk tilts and/or moves translationally, these plates ensuring the centering and the retention in rotation of the latter.

Furthermore, according to U.S. Pat. No. 2,564,057, in the name of the applicant, and which also relates to a control device of this type, the articulation mechanism comprises at least three laminated deformable assemblies distributed about the rotor shaft and each consisting of an alternating stack of dishes made from a rigid material and of layers of an elastic material permitting, by the deformation in shear of the elastic material, the oscillations of the rotating disk and non-rotating disk with respect to the shaft, so as to control the cyclic pitch.

In order to control the collective pitch, the three laminated deformable assemblies are integrally connected to a common collar mounted so as to slide along a fixed disk guide integrally connected to a casing which is rigidly joined to the structure of the rotorcraft, and in the form of a cylinder of circular cross-section mounted coaxially about a part of the rotor shaft. Each laminated deformable assembly comprises a laminated block in the form of a portion of a sphere, the dishes of rigid material and the layers of elastic material of which are portions of spherical caps, in order to ensure a good radial positioning of the cyclic disks, a stiffness which is appropriate for the radial forces, and a sufficient flexibility in angular rotation of the blocks by shearing of the elastic material. The laminated block is integrally connected, on the one hand, to an inner armature which is curved in an arc of a circle and which is assembled with the inner armatures of the other laminated deformable assemblies in order to constitute the common collar sliding on the disk guide consisting of two semi-cylindrical shells assembled with each other about the rotor shaft and, on the other hand, to an outer armature assembled with the inner race of the ball bearing or bearings connecting the two disks.

In the various embodiments of the cyclic-disk control devices described in the abovementioned patents, and also in the more conventional embodiments of such devices, in which the cyclic disks are articulated by the non-rotating disk on a swivel joint mounted so as to slide axially about the rotor shaft. The non-rotating disk is retained by at least one non-rotating scissor link assembly and the rotating disk being driven in rotation with the shaft by at least one rotating scissor link or alternatively as in the French Patent 2,570,673 of the applicant in which the mechanism for guiding in axial translational motion and in angular displacement and for retaining the non-rotating disk in rotation. The mechanism for driving the rotating disk in rotation consist of two sets of flexible and curved plates for the suspension and centering of the disks. One of the sets comprises at least one plate connecting the structure to the non-rotating disk and the other of the sets comprises at least one blade but preferably a plurality of plates, connecting the rotating disk to the shaft or to the hub of the rotor. The device as a whole must ensure, in addition to the functions of locking the non-rotating disk in rotation, of driving the rotating disk in rotation and of permitting the axial translation motion of the two disks for the collective-pitch control. The two other functions necessary for the piloting of a helicopter when pitching and when rolling and consisting in permitting the angular deflections of the disks about the (main) pitching control axis, or tilting axis of the cyclic disks in pitching control, or alternatively control axis of the disks in longitudinal oscillation, termed longitudinal tilting axis in the remainder of the following description, and lastly in permitting the angular deflections of the disks about the (secondary) rolling control axis, or tilting axis of the cyclic disks in rolling control, or control axis of the disks in lateral oscillation, termed lateral tilting axis in the remainder of the present description.

In general, the two disks are displaced in axial translational motion and/or in a tilting motion by three pilot-control linear actuators which are connected to the collective-pitch lever and to the cyclic-pitch joystick maneuvered by the pilot by way of a collective-pitch control chain, a pitching-control chain and a rolling-control chain which are formed from rigid connecting rods joined together functionally by transmissions, relays and control switches.

In all the abovementioned control devices of the state of the art, the articulation means permitting the movements of the disks about the lateral tilting axis, the amplitude of which is approximately three times less than that of the movements of the disks about the longitudinal tilting axis, are simultaneously the articulation means which permit these same movements of the disks about this longitudinal tilting axis, with the result that these articulation means, defining both of the two perpendicular axes of pivoting of the disks, cannot be optimized for each of these two types of movement.

SUMMARY OF THE INVENTION

The present invention proposes to overcome the disadvantages of the abovementioned devices of the state of the art and/or to improve these devices.

In particular, the object of the invention is to propose a control device with cyclic disks in which the means permitting the lateral tilting movements of the disks, of fairly small amplitude, are uncoupled from the means permitting their longitudinal tilting movements, of larger amplitude, so as to permit a better adaptation and an optimization of these various means to their various specific functions, and hence to obtain a better reliability and durability of the control device without, however, substantially increasing its complexity or its overall size.

Furthermore, in the image of French Patent 2,564,057, another object of the invention is to ensure that the pieces of the articulation mechanism of the disks with respect to the rotor shaft are not highly stressed so as to increase further their longevity and to reduce the frequency of maintenance operations.

Yet another object of the invention is to ensure that virtually all the pieces susceptible to wear of the device for controlling the collective pitch and cyclic pitch of the blades can be changed individually without dismantling the rotor mast.

Yet another object of the invention is to eliminate the risks of the control means jamming, and any lubrication of the control device with oil or with grease.

However, in a manner even more specific to the present invention, one of its objects is to free optimally the central part of the control device so that the shaft of the rotor, when it simultaneously performs the role of a hub-support mast, can be provided with a relatively large diameter and a small thickness so as to provide, within the rotor shaft, a large space available for being able to accommodate easily complementary equipment such as a fastening and wiring member for a mast sighting device for a military helicopter.

In this connection, it should be noted that, in French Patents 2,227,175 and 2,569,387, the connecting rods in the form of scissors, or the plates, take up a considerable space inside the ring formed by the rotating and non-rotating disks, and consequently do not permit the passage inside this ring of a large-diameter mast.

In order to overcome the disadvantages and to solve the problems presented above, the invention provides a device for controlling the collective pitch and the cyclic pitch of the blades of a rotorcraft rotor, of the type mentioned at the beginning of the present description and wherein the articulation mechanism comprises, on the one hand, two swivel joints arranged in diametrically opposite positions on either side of the axis of rotation of the rotor shaft and on either side of the lateral tilting axis, and centered on the longitudinal tilting axis. Each of the two swivel joints is retained between a disk support, mounted so as to slide along the disk guide, and the non-rotating disk, so as to permit the oscillations of the latter about the longitudinal tilting axis. On the other hand the articulation mechanism comprises, two linking assemblies which are rigid under torque stresses about the axis of the rotor shaft but are deformable in a direction substantially parallel to the axis of rotation of the rotor shaft, and each of which is mounted between respectively one of the swivel joints and the disk support so as to permit the oscillations of the non-rotating disk about the lateral tilting axis by the differential deformations of the two linking assemblies.

The device provided by the invention thus simultaneously ensures the tilting of the assembly formed by the rotating and non-rotating disks about the pitching-control axis, the tilting of this same assembly of disks about the rolling-control axis, the vertical translational motion of this assembly of disks, the driving of the rotating disk in rotation and the locking of the non-rotating disk in rotation. By virtue of the structure specific to the invention, in which the articulations are formed between non-rotating members, these articulations are little stressed since, when in operation, they work statically. Furthermore, this articulation mechanism based on deformable linking assemblies and on swivel joints eliminates all risks of the control means jamming at the level of the oscillations of the disks with respect to the shaft of the rotor. Another significant advantage which follows from the device according to the invention lies in the uncoupling between the articulation means permitting the two necessary tilting movements. Indeed, the articulation mechanism according to the invention is designed in such a way that it effects an uncoupling between the articulation means permitting the lateral tilting movements and the articulation means permitting the longitudinal tilting movements of the non-rotating disk, with the result that the deformable linking assemblies of this articulation mechanism, which are subjected only to lateral deformations of small amplitude, are subjected to only small stresses, which permits a compact design of these linking assemblies. The two tilting movements of the non-rotating disk, and thus also of the rotating disk, are permitted by two different sets of means, one comprising two swivel joints, which may be of a small size, for the main control which is longitudinal control, and the other comprising pieces which are deformable, and preferably to this end flexible, for the secondary control which is lateral control. Indeed, since the tilting movement of the assembly of the rotating and non-rotating disks about the lateral control axis is approximately three times less than the tilting movement of these disks about the longitudinal axis, the lateral tilting movements can be permitted in an appropriate manner by the deformable linking assemblies, which are rigid against torque stresses about the axis of the rotor shaft, while the swivel joints will allow longitudinal tilting movements of larger amplitude all the more easily since they are centered on the longitudinal tilting axis of the non-rotating disk. The linking assemblies experience only a limited lateral deformation and are subjected to low stresses, which permits a compact design of the control device.

Furthermore, the device according to the invention permits the mounting of the cyclic plates about a large-diameter rotor shaft, by virtue of the fact that the various means of the articulation mechanism are installed between the disk support and the non-rotating disk, and hence do not obstruct the space defined inside this disk support and the disk guide. This results in the use, specific to the invention, of different sets of articulation means for defining the two mutually perpendicular pivoting axes of the disks.

According to the invention, each of the linking assemblies can comprise at least one self-lubricating sliding mechanism with at least one shoe sliding on at least one rail, one of the two members, the rail or the shoe, being linked to the corresponding swivel joint and the other being linked to the disk support.

Advantageously, however, in order to improve reliability, each of the linking assemblies comprises at least one laminated block comprising at least one alternating stack of at least one thin plate of a rigid material and of at least two layers of an elastically deformable material, the laminated block being held between the disk support and an outer cage of the corresponding swivel joint so that, by the deformation of the elastically deformable material, the swivel joint and the outer cage can be displaced in a direction substantially parallel to the axis of rotation and with respect to the disk support, in order to permit the oscillations of the disks about the lateral tilting axis.

In order to facilitate the mounting of the laminated blocks, the thin plates and the layers of each alternating stack are advantageously retained between an outer rigid armature connected to a retaining lug integral with the disk support, and an inner rigid armature connected to the outer cage of the corresponding swivel joint.

In order to permit an adjustable and advantageously simple and inexpensive fixing of the outer armature to the retaining lug, the outer armature has, on the side opposite the inner armature, a retaining boss engaged in a recess of a threaded member screwed onto this retaining lug.

The same advantages are obtained for the fixing of the inner armature to the outer cage of the corresponding swivel joint if, in accordance with the invention, the inner armature has, on the side opposite the outer armature, a shoulder and a tapped part which are arranged on either side of a bearing surface opposite which the outer cage is fixed to the inner armature, being held in abutment with the shoulder by the screwing of a threaded member into the tapped part.

Advantageously, so that the laminated blocks contribute effectively to the retention in rotation of the non-rotating disk, each alternating stack is preferably centered on an axis passing through the center of the corresponding swivel joint and perpendicular to the plane defined by the axes of rotation and of longitudinal tilting.

Taking into account the relatively small amplitude of the angular oscillations about the lateral tilting axis, and in order to permit an advantageously compact form of the laminated blocks, each alternating stack comprises thin rigid plates and deformable layers which are plane and which extend substantially parallel to the plane defined by the axes of rotation and of longitudinal tilting so as to permit the oscillations of the disks about the lateral tilting axis by shearing of the deformable layers of the laminated blocks.

Advantageously, in order to balance the forces exerted on the various elements of the articulation mechanism, each laminated block comprises two alternating stacks, arranged on either side of the corresponding swivel joint, and between two retaining lugs projecting on the disk support, on either side of the longitudinal tilting axis. Furthermore, the two alternating stacks and the two retaining lugs are advantageously arranged respectively symmetrically relative to each other with respect to the longitudinal tilting axis, the two retaining lugs extending, moreover, substantially parallel to this axis.

In order to facilitate the production of each laminated block, the two stacks of this block advantageously have outer armatures which constitute two opposite parts of a same, outer rigid tubular piece which envelops the two stacks of the corresponding laminated block as well as the corresponding swivel joint and its outer cage.

Similarly, it is advantageous for the two stacks to have inner armatures which constitute two opposite parts of a same, inner, rigid tubular piece, in the central recess of which are housed the corresponding swivel joint and its outer cage, the latter advantageously being retained against a shoulder projecting toward the inside of the recess by the screwing of an externally threaded nut into a tapped end part of this recess. This structure makes it possible to facilitate the simultaneous positioning of the inner armatures of the two alternating stacks about the corresponding swivel joint.

In order to facilitate the mounting of each swivel joint between the non-rotating disk and the disk support, each swivel joint is advantageously mounted on a fixing element which is integrally connected to the non-rotating disk. To this end, this fixing element advantageously comprises a base curved in an arc of a circle, which is applied and fixed against the non-rotating disk, and an axle journal which is radial with respect to the axis of rotation of the rotor and about which the swivel joint is mounted. This mounting is facilitated and advantageously effected in order to permit the tilting of the disks about the longitudinal tilting axis if each swivel joint has a central cylindrical bore by way of which it is engaged coaxially with respect to the longitudinal tilting axis, about a bearing surface defined on the radial axle journal between a shoulder and one threaded end of this axle journal, with the result that the swivel joint can be held opposite the bearing surface, being applied in abutment with the shoulder by a nut screwed onto the threaded end of the axle journal.

In a preferred embodiment of the control device according to the invention, the fixing element is fixed by way of its curved base against the inner radial face of the non-rotating disk which is itself in an inner radial position with respect to the rolling bearing or bearings and to the rotating disk, and the corresponding axle journal extends radially inwards and has its threaded end opposite the disk support and in an inner radial position with respect to its abutment shoulder for the swivel joint, while the abutment shoulder for the corresponding outer cage on the inner armature of at least one corresponding alternating stack is in an inner radial position, toward the axis of rotation and with respect to the tapped part of the inner armature in which is screwed the threaded member holding the outer cage on this inner armature, the corresponding outer armature being in this case integrally connected to the corresponding retaining lug which projects radially outwards on the disk support.

According to another advantageous feature of the invention, each upper linking member, intended to drive the rotating disk in rotation with the rotor shaft, is a rotating scissor link assembly articulated on the rotating disk by way of a swivel joint, the center of which, and the centers of the swivel joints for the tilting of the disks about the longitudinal tilting axis, are contained in a same plane defined by the longitudinal tilting axis and the lateral tilting axis. In a similarly advantageous manner, the pitch connecting rods are articulated on the rotating disk by way of swivel joints, the centers of which, and the centers of the swivel joints for the tilting of the disks about the longitudinal tilting axis, are contained in this same plane defined by the longitudinal tilting axis and the lateral tilting axis.

Advantageously, furthermore, in order to be able to dispense with a non-rotating scissor link assembly for retaining the non-rotating disk in rotation, the disk support mounted so as to slide along the fixed disk guide is a tubular member mounted substantially coaxially about the disk guide and having inner axial splines engaging with outer axial splines, of a corresponding shape, of the disk guide in order to guide the axial translational motions, parallel to the axis of rotation, of the disk support with respect to the disk guide, while at the same time preventing any relative rotation of the disk support and of the disk guide about the axis of rotation, with the result that the disk guide constitutes simultaneously the lower linking member, fixed to the casing rigidly linked to the structure of the rotorcraft, in order to immobilize the non-rotating disk in rotation. This mounting has the additional advantage that the sliding displacements take place on non-rotating pieces so as to limit the wear of these pieces under the dynamic movements and forces.

Lastly, in order to effect advantageously the anchoring of the rotor shaft in the casing of the main transmission box of the helicopter and to facilitate simultaneously the production of the disk guide, the outer axial splines of the latter extend along an upper section, in the form of a cylinder of circular cross-section, of this disk guide, which comprises a frustoconical lower end part, flared toward the casing and having an outer radial shoulder bolted onto the casing, and a flange for centering on this casing which ensures the annular retention of an outer race of a single lift rolling bearing in which the lower end of the rotor shaft is embedded.

BRIEF DESCRIPTION OF THE DRAWINGS

The invention will be better understood with the aid of a particular illustrative embodiment described below by way of non-limiting example with reference to the attached drawings, in which.

DESCRIPTION OF THE PREFERRED EMBODIMENTS

Figure 1:
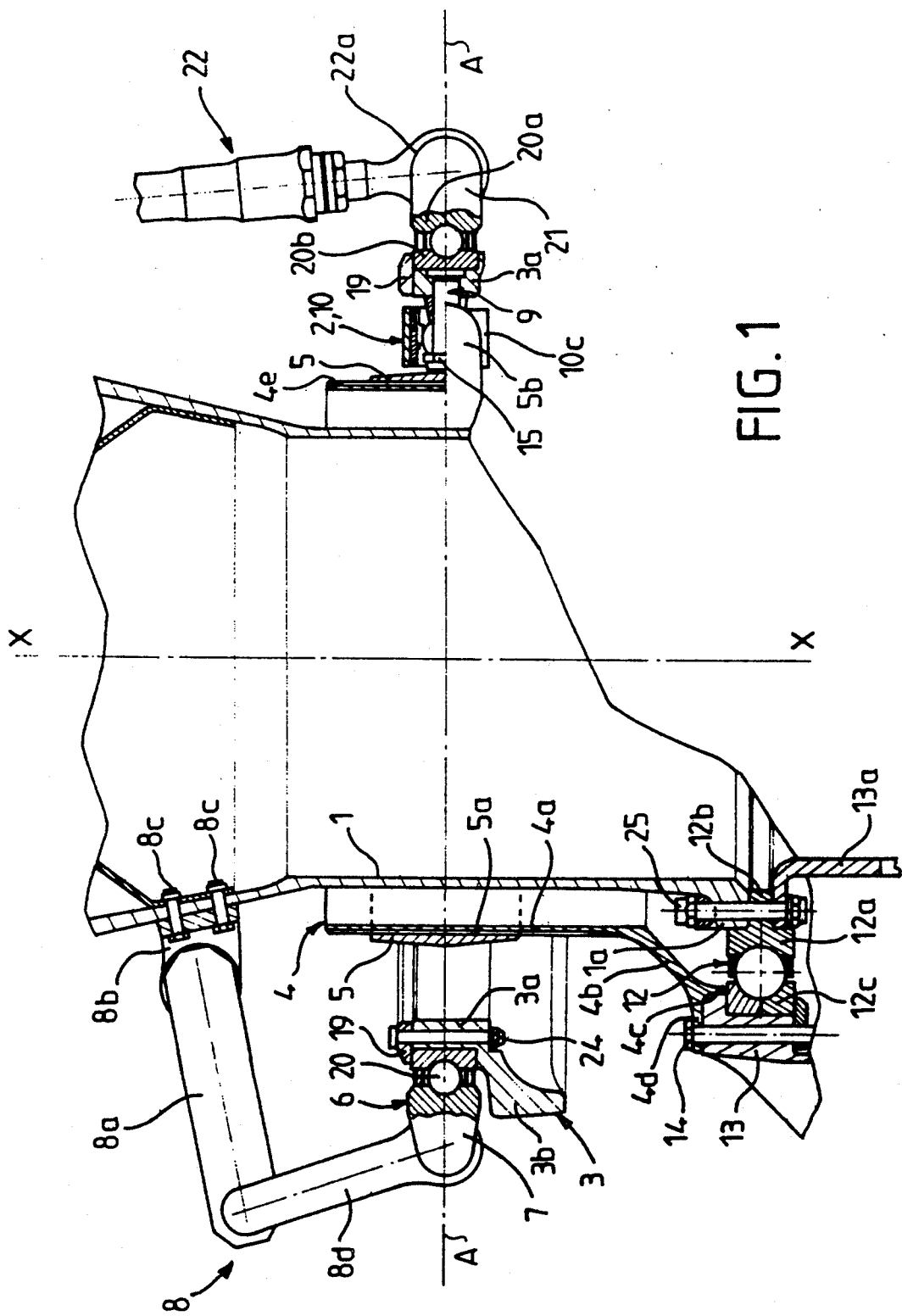
FIG. 1 shows a view essentially in a split vertical section passing through the axis of rotation, and partially in lateral elevation with partial cutaway, of a helicopter rotor mast equipped with the pitch-control device according to the invention and comprising cyclic disks mounted on rotational-laminated articulations.
Figure 2:
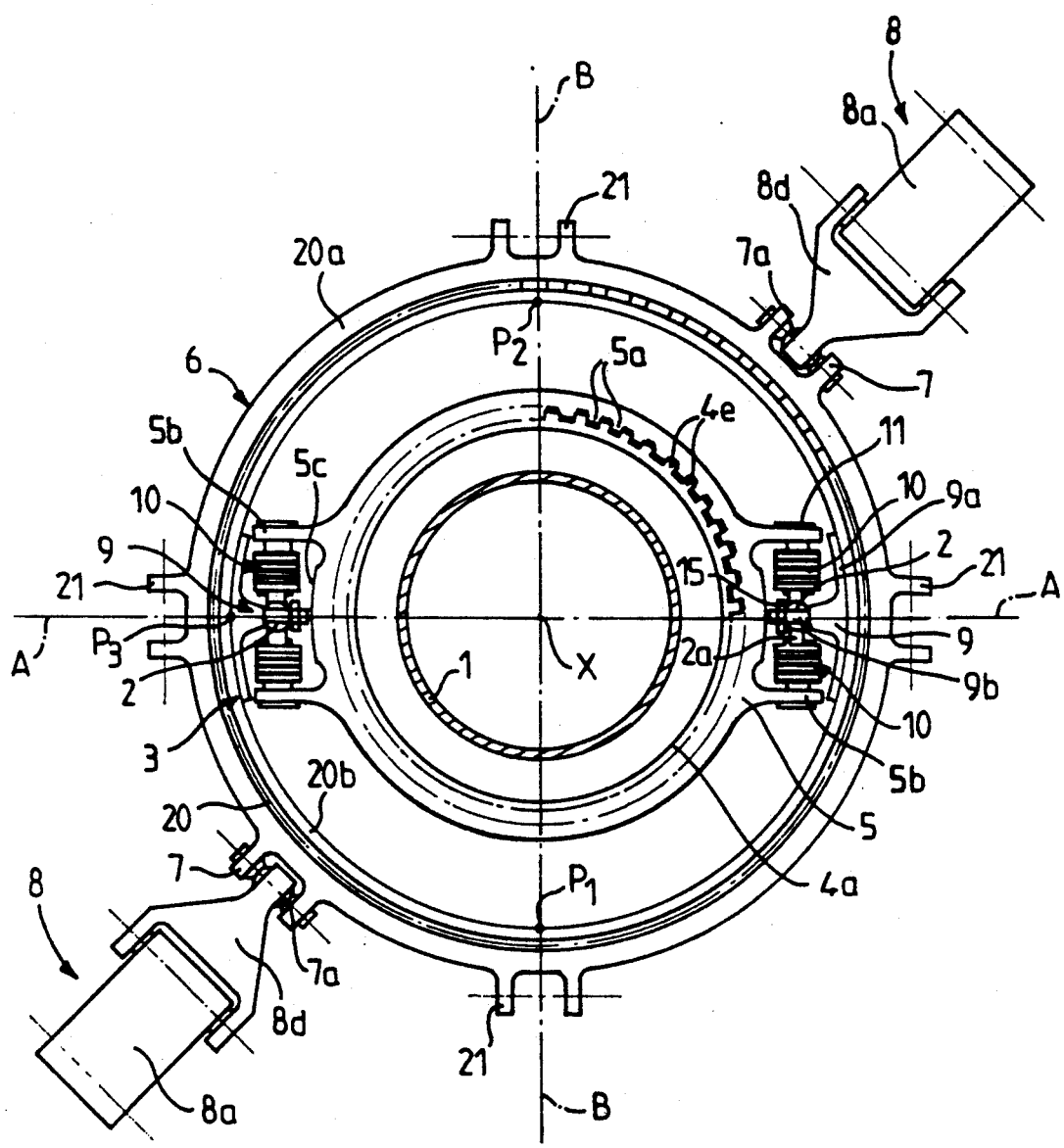
FIG. 2 is a view partially in plan and partially in cross-section of the device in FIG. 1.
Figure 3:
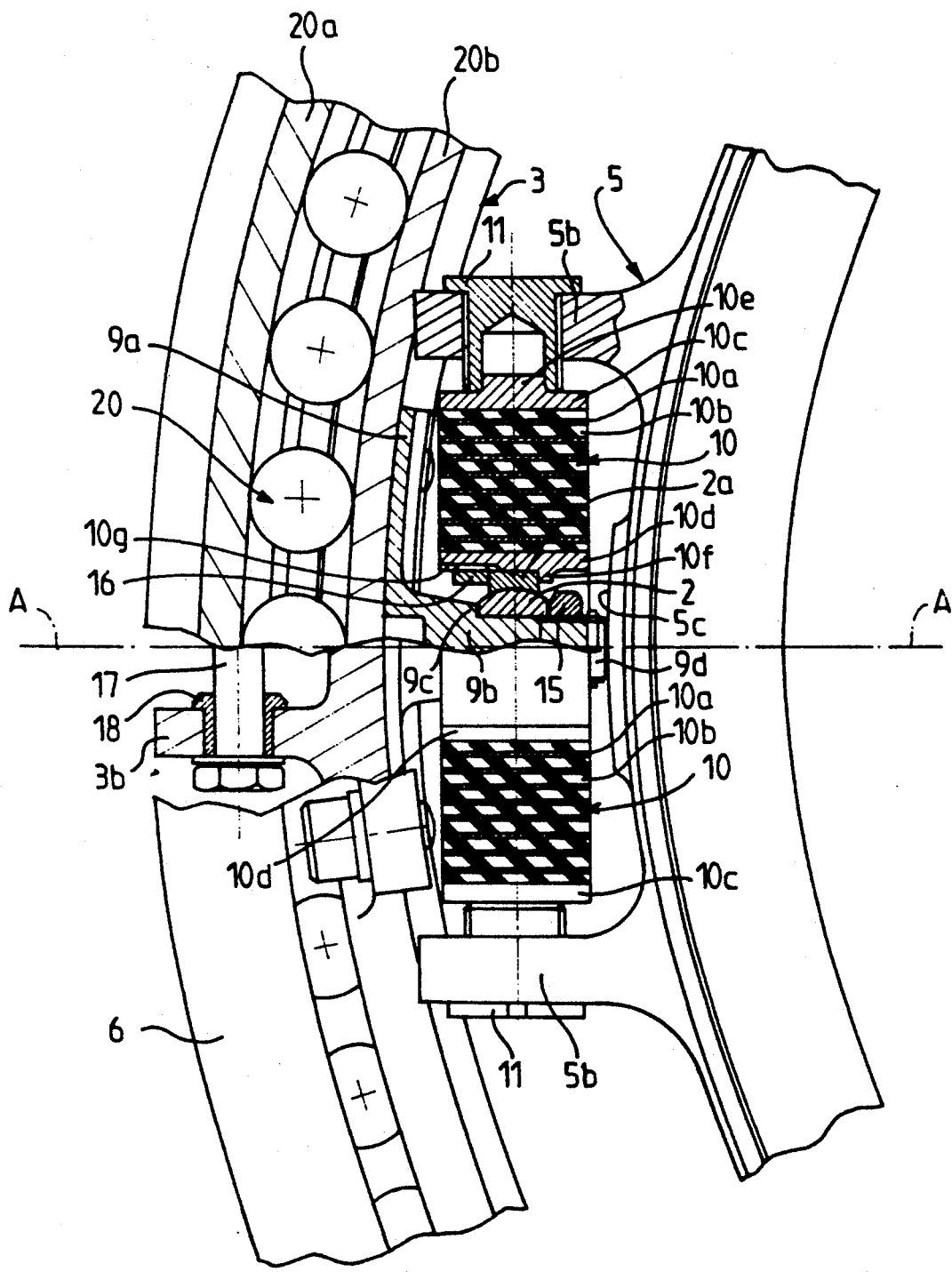
FIG. 3 is a view on a larger scale of a detail of FIG. 2.

With reference to FIGS. 1 to 3, the rotor mast, which is by way of example that of a four-blade lifting rotor of a helicopter, comprises a tubular shaft 1 having, in this example, a cylindrical central part and a frustoconical upper part, and which is driven in rotation about its axis X—X by its lower part (shown partially) engaging with the output of the main transmission box of the helicopter. The rigid link between the shaft 1 of the rotor and the main transmission box is ensured inside a casing 13 covering the upper part of the main transmission box and integral with the structure of the helicopter. In the casing 13, the shaft 1 is anchored in a single lift rolling bearing 12 which sustains, in flight, the lift force and the tilting moments of the rotor and transmits them to the structure of the helicopter, and which, when on the ground, supports the weight of this rotor. This anchoring is ensured at the level of the lower end of the shaft 1, arranged at a collar 1a projecting radially and thickened toward the outside of this shaft, by a ring of screw/nut assemblies 25 which traverse this collar 1a axially in order to connect it integrally, on the one hand, to an outer radial collar of the upper end of an output shaft 13a of the main transmission box, for the driving in rotation the shaft 1 and, on the other hand, to an inner radial flange 12b of the inner race 12a of this lift rolling bearing 12, the outer race 12c of which is itself anchored in the casing 13. The rotor (not shown) is, conventionally, integrally connected to the upper end of the shaft 1 by a hub, to which a plurality of blades, four in this example, are each connected by their root equipped with a lever for controlling the angle of attack or the pitch of the corresponding blade. In the example shown in FIG. 1, the rotor shaft 1 and the hub can be produced in the form of an integrated tubular hub mast as described, for example, in the French Patents 2,584,995 and 2,584,996 of the applicant.

About the shaft 1 there is mounted coaxially a fixed disk guide 4 which comprises, about the cylindrical central part of the rotor shaft 1, an upper section 4a having externally the shape of a truncated cylinder of circular cross-section and the base of which is extended toward the casing 13 by a part in the shape of a frusto-conical skirt 4b diverging toward the casing 13 and terminating in an axial flange 4c for centering in the upper opening formed in the casing 13 for the passage of the shaft 1, and in an outer radial shoulder 4d by means of which the disk guide 4 is integrally connected to the casing 13 by means of a ring of screws 14. The outer face of the cylindrical upper section 4a of the disk guide 4 which, like the casing 13, is for example made from a light metal alloy, has axial splines 4e. These engage with axial splines 5a of a complementary shape machined on the inner face of a disk support 5 which is tubular and has a cylindrical central bore of circular cross-section, and the outer face of which has a slightly biconical shape, this disk support 5 being mounted about the disk guide 4 so as to permit the retention in rotation and the axial sliding of this support 5 along the disk guide 4, with the result that this support 5 thus forms an element for retaining a non-rotating disk 3, thus locked in rotation about the axis X—X of the rotor shaft and which it supports in the manner described below.

In addition to the non-rotating disk 3 mentioned above, the device for controlling the collective pitch and the cyclic pitch of the blades of the rotor also comprises a rotating disk 6. Both disks 3 and 6 are annular, assembled by a single ball bearing 20 of large diameter, and mounted concentrically with a radial spacing about the sliding retaining support 5, the disk guide 4 and the rotor shaft 1. The support 5 and disk guide 4 act as a lower linking member. The non-rotating disk 3, in the inner radial position with respect to the other disk 6 and to the rolling bearing 20, is immobilized in rotation by the support 5 and the disk guide 4, fixed to the casing 13 rigidly linked to the structure of the helicopter, and this non-rotating disk 3 is mounted, on the one hand, so as to be displaceable in axial translational motion along the axis X—X of the shaft 1 by sliding of the support 5 along the disk guide 4 and, on the other hand, so as to oscillate with respect to this shaft 1 via an articulation mechanism which is described below. The other disk, in the outer radial position with respect to the rolling bearing 20 and to the non-rotating disk 3, is a rotating disk 6 intended to be driven in rotation with the shaft 1 of the rotor by two upper linking members arranged as driving scissor link assemblies or rotating scissor link assemblies 8 mounted in diametrically opposite positions with respect to the axis X—X of the shaft 1, and the upper arm 8a of each one is connected to the shaft 1 via a fork 8b integrally connected to this shaft 1 by screws such as 8c, and on which the upper arm 8a pivots about an axis perpendicular to the diametral plane of the shaft 1, passing through its axis X—X and through the center of the fork 8b, while the lower arm 8d of each rotating scissor Link assembly 8, articulated in pivoting fashion at its upper end, shaped in the form of a fork, on the lower end of the upper arm 8a about an axis parallel to the axis of pivoting of the upper end of the upper arm 8a in the fork 8b, is articulated at its lower end by way of a swivel joint 7a in a fork 7, the two parallel arms of which project essentially radially outwards on the rotating disk 6.

This rotating disk 6 also has other outer radial forks 21, in a number equal to the number of the blades of the rotor, i.e. four forks 21 in this example, which are regularly distributed in the circumferential direction over the periphery of the rotating disk 6 and offset in this direction with respect to the two forks 7 for articulating the rotating scissor link assemblies 8. In each of the forks 21 there is articulated the swivel-joint joining piece 22a forming the lower end of a pitch connecting rod 22 of fixed length but adjustable in order to permit the aerodynamic adjustment of the rotor, and the swivel-joint joining piece (not shown) of which at the upper end is articulated on the pitch-control lever of a corresponding blade of the rotor (likewise not shown).

In a known manner, the non-rotating disk 3 is urged by collective-pitch control members which control its displacements in translational motion along the disk guide 4, as well as by cyclic-pitch control members which control its oscillations with respect to the shaft 1, with the result that the rotating disk 6, which follows the movements of the non-rotating disk 3, transmits these movements to the pitch-control levers of the blades of the rotor, via the pitch connecting rods 22. These collective-pitch control members and cyclic-pitch control members consist of linear actuators such as three control connecting rods or three servo-control jacks (not shown) mounted in a conventional manner between the structure of the helicopter and the non-rotating disk 3, on which non-rotating disk each of them is articulated by a swivel joint retained by a transverse pin in a fork integral with the non-rotating disk 3, as described below with reference to FIG. 3.

According to the invention, the articulation mechanism comprises two swivel joints 2 which are diametrically opposite with respect to the axis of rotation X—X of the shaft 1 and with respect to the lateral tilting axis B—B of the disks 3 and 6, which is the rolling-control tilting axis, the two small swivel joints 2 being furthermore each centered on the longitudinal tilting axis A—A of the disks 3 and 6, which is the pitching-control tilting axis, perpendicular to the axes X—X and B—B, and each retained, in the manner described in more detail below, between the retaining support 5 of the non-rotating disk 3 and an element 9 for fixing to this disk 3. Moreover, the tilting of the non-rotating disk 3 about the lateral tilting axis is permitted by two linking assemblies which are rigid against torque stresses about the axis X—X of the shaft 1 but which are deformable in a direction substantially parallel to the axis X—X, and each of which is placed in between a respective swivel joint 2 and the retaining support 5.

As shown in FIGS. 1 to 3, each linking assembly is produced in the form of a laminated block with two stacks 10 of flexible layers and of alternating rigid plates which are arranged on either side of the corresponding swivel joint 2 and in a direction intersecting the axis A—A and perpendicular to the plane defined by this axis A—A and the axis of rotation X—X, each pair of stacks 10 of a laminated block being retained, radially toward the outside with respect to the axis A—A, between two retaining lugs 5b projecting outwards on the disk support 5 and parallel to each other and to the axis A—A, while the two stacks 10 of each laminated block are retained, radially toward the inside with respect to the axis A—A, on an outer cage 2a of the corresponding swivel joint 2.

More precisely, each laminated half-block 10 comprises an alternating stack of thin plates 10a of a rigid material, and of layers 10b of an elastically deformable material such as an elastomer, the thin plates 10a and the layers 10b being plane and parallel to the plane defined by the axes X—X and A—A, and attached to one another by vulcanization or adhesive bonding, in such a way that, at rest, each stack 10 is centered on the axis passing through the center of the rotational joint 2 and perpendicular to the plane defined by the axes X—X and A—A, and this stack 10 is integrally connected by the two end elastic layers 10b, on the one hand, against the inner face, with respect to the axis A—A, of an outer rigid armature 10c which is linked to the corresponding retaining lug 5b and, on the other hand, against the outer face, with respect to the axis A—A, of an inner rigid armature 10d which is linked to the outer cage 2a in which the corresponding swivel joint 2 is articulated.

The outer rigid armature 10c has, projecting on its outer face (on the side opposite the swivel joint 2) a cylindrical boss 10e which is engaged, centered and retained in a blind central bore of the shank of a locking screw 11 screwed into a tapped bore traversing the retaining lug 5b, coaxially with the stack 10, with the result that the head of the screw 11 bears against the outer face of the lug 5b and that the shank of the screw 11 traverses the tapped bore of this lug 5b and projects with its end inside this lug 5b, toward the axis A—A. The two outer armatures 10c may be two opposite sides of a same outer tubular metal piece, of rectangular cross-section, which envelops the two stacks 10 of a laminated block and the corresponding swivel joint 2.

Each of the swivel joints is mounted on the non-rotating disk 3 by fixing element 9 which comprise a base curved in an arc of a circle 9a, extending symmetrically with respect to the rotational joint 2, on either side of the axis A—A and opposite the laminated stacks 10, and the outer radial face (with respect to the axis X—X) of which is convex and has a curvature which corresponds to that of the concave inner radial face of the non-rotating disk 3, against which it is applied by screws for fixing the curved base 9a to the non-rotating disk 3. Each fixing element 9 also comprises a central axle journal 9b which extends radially inwards (with respect to the axis X—X) and coaxially about the axis A—A, between the non-rotating disk 3 and a contact surface 5c projecting radially outwards with respect to the axis X—X, on the support 5, between the two corresponding retaining lugs 5b.

The corresponding swivel joint 2 has a central and through cylindrical bore by means of which it is engaged on the spindle 9b and mounted about a cylindrical bearing surface machined on the periphery of this axle journal 9b between a radial shoulder 9c of this axle journal 9b, on the base 9a side, and the externally threaded, inner radial end 9d of this axle journal 9b, onto which is screwed and retained a locked and cottered nut 15 holding the swivel joint 2 axially in position on the axle journal 9b.

The inner armatures 10d of the two stacks 10 of a same laminated block are two opposite parts of a same inner, tubular metal piece of this block, this piece having a cylindrical axial bore, in the central part of which a smooth cylindrical bearing surface has been machined between an inner radial shoulder 10f, on the support 5 side, and an internal screw thread 10g in the end part facing the non-rotating disk 3, with the result that the outer cage 2a of the swivel joint 2, which is articulated about the latter, can be engaged and retained in this smooth bearing surface between the abutment shoulder 10f and an externally threaded nut 16 which is screwed into the internal screw thread 10g.

The links between the rolling bearing 20 and the rotating disk 6 and non-rotating disk 3 are effected in a known manner, for example as described in FR-A-2,564,057. The outer race 20a and inner race 20b of the rolling bearing 20, of a large dimension and stiffened, simultaneously constitute annular parts respectively of the rotating disk 6 and of the non-rotating disk 3. As already described above, the radial forks 7 and 21 in which are articulated respectively the rotating scissor link assemblies 8 and the pitch connecting rods 22, project radially outwards from the outer race 20a of the rolling bearing 20 and are integral with this outer race 20a. Furthermore, however, these radial forks 7 and 21 are produced in such a way that the centers of the swivel joints 7a for fixing the rotating scissor link assemblies 8 in the forks 7, the centers of the swivel joints 22a for articulating the pitch connecting rods 22 in the forks 21, and the centers of the two swivel joints 2 are coplanar and situated in the plane defined by the longitudinal tilting axis A—A and lateral tilting axis B—B.

A ring 19, applied to the upper face of the inner race 20b of the rolling bearing 20, and an annular part 3a for reinforcing the inside of the inner race 20b, the lower face of which rests against a shoulder of the annular part 3a, in order to form the non-rotating disk 3, are fixed to the inner race 20b by a ring of locked and cottered screw/nut assemblies 24. The annular part 3a is extended radially outwards and downwards by skirt elements 3b, arranged in three radial forks for the articulation on the non-rotating disk 3 of the upper ends of the pilot controls (control connecting rods or servo-controlled jacks). Two of these forks (not shown) have their two arms parallel to each other and symmetrical to each other with respect to the axis B—B, and these two forks are diametrically opposite along the axis B—B with respect to the axis X—X. In FIG. 2, the centers of the swivel joints for articulation of two of the three pilot controls in these two forks have been shown at $P_1$ and $P_2$. In this same FIG. 2, the center of the swivel joint for articulation of the third pilot control in the third articulation fork on the non-rotating disk 3 has been shown at $P_3$, this third fork being partially shown in FIG. 3. Its two arms, only one of which can be seen in FIG. 3, are parallel to each other and to the axis A—A, and they are connected to each other by a pivot pin 17 retaining the corresponding swivel joint and itself mounted in the arms of the fork 3b by shouldered bushes such as 18.

In the case of the use of a pure control chain (without a phase shifter), the longitudinal pilot controls are articulated on the non-rotating disk 3 at the level of the points P1 and P2 (see FIG. 2), while the lateral pilot control is articulated on the non-rotating disk 3 at the level of the point P3.

The orientation of the device according to the invention with respect to the axes of the helicopter takes into account the pitch/flapping phase displacement angle (close to 90°) and the angle between the longitudinal axis of each blade and its pitch-control axis.

A device is thus obtained for controlling the collective pitch and the cyclic pitch of the blades of a rotor, in which the non-rotating disk 3 is immobilized in rotation by virtue of the laminated blocks 10, the disk support 5 and the fixed disk guide 4, engaging with the disk support 5 by way of axial splines, and by virtue of which a simultaneous and equal action exerted in the same direction by the pilot controls on the non-rotating disk 3 drives the assembly consisting of the two disks 3 and 6, the rolling bearing 20, the articulation mechanism with swivel joints 2 and laminated blocks 10, and the disk support 5 in translational motion along the disk guide 4. This sliding movement is transmitted, by pulling or pushing on the pitch connecting rods 22, simultaneously to all the pitch-control levers, with the result that it is possible to control the collective pitch of the blades. On the other hand, a differential action of the pilot controls causes the assembly consisting of the disks 3 and 6 and the rolling bearing 20 to be inclined with respect to the axis of rotation X—X, while the disk support 5 is not displaced, which corresponds to the transmission of a cyclic pitch transmitted by the pitch connecting rods 22 to the pitch-control levers of the blades.

The advantage of the articulation mechanism describe above, comprising two swivel-laminated articulations with swivel joints 2 and laminated blocks 10, is that it effects an uncoupling between the lateral tilting movements and the longitudinal tilting movements of the disks 3 and 6. Indeed, the swivel joints 2, each mounted at the center of a laminated block, between the two alternating stacks 10 of the latter, and about an axle journal 9b for linking to the non-rotating disk 3, and coaxial about the longitudinal tilting axis A—A, permit the rotation of this non-rotating disk 3 and hence also of the rotating disk 6 about this axis A—A on which the swivel joints 2 are centered, under the effect of a differential action of the pilot controls articulated at the points P1 and P2 on the non-rotating disk 3.

On the other hand, a differential action of the pilot control articulated at the point P3 on the non-rotating disk 3, with respect to the pilot controls articulated at P1 and P2, causes a tilting of the non-rotating disk 3 and hence also of the rotating disk 6 about the lateral control axis B—B, by deformation in shear of the elastomeric layers 10b which permit a displacement, substantially in the direction of the axis of rotation X—X, of the inner armatures 10d of the stacks 10 with the swivel joints 2 and the axle journals 9b with respect to the outer armatures 10c which are retained on the support 5. Indeed, in the laminated block 10—10 situated on one side of the axis B—B, the inner armature 10d of each of the two stacks 10 of this laminated block is lowered with respect to the corresponding outer armature 10c, while in the laminated block situated on the other side of the axis B—B, the inner armature 10d of each stack 10 is raised with respect to the corresponding outer armature 10c, these differential deformations permitting the lateral deflections of the disks 3 and 6 about the axis B—B.

By virtue of their arrangement, the laminated blocks (10—10) also form part of the chain for locking the non-rotating disk 3 in rotation, since any tendency of the non-rotating disk 3 to be driven in rotation by the rotating disk 6 about the axis of rotation X—X stresses the laminated blocks in tension/compression, via the axle journals 9b and the swivel joints 2 and along the axis of the stack 10, i.e. in a direction in which these laminated blocks 10—10 have a high rigidity.

By virtue of the small amplitude (a few degrees) of the angular deflections about the lateral control axis B—B, it is sufficient to produce the laminated blocks in the form of flat laminated blocks. Furthermore, because these laminated blocks 10—10 are subjected only to low stresses, a compact form of these blocks is possible.

It should also be noted that the swivel joints 2 make it all the more easy for the disks 3 and 6 to tilt about the longitudinal control axis A—A since the axis of their central bore, which is also the axis of the axle journal 9b on which each of them is mounted, coincides with this longitudinal tilting axis A—A.

In summary, in the control device according to the invention, the retention in rotation and the translational motion of the non-rotating disk 3 are ensured by a disk support 5 sliding along a fixed disk guide 4 equipped with splines, whereas, on the one hand, the longitudinal tilting of the disks 3 and 6 is ensured about the longitudinal control axis A—A by two swivel joints 2 arranged at 180° relative to each other with respect to the axis of rotation X—X, between the sliding disk support 5 and the non-rotating disk 3, and whereas, on the other hand, the lateral tilting of the disks 3 and 6 is permitted by differential deformation of the laminated blocks 10—10 arranged parallel to the plane defined by the axis of rotation X—X and by the longitudinal tilting axis A—A, between the sliding disk support 5 and the outer cages 2a of the swivel joints 2.

Furthermore, the device according to the invention and as described above has the major advantage of freeing completely the central part of this device, with the result that the rotor shaft 1, when it simultaneously performs the role of a hub-support mast, as is the case in the example described above, can be provided with a relatively large diameter and with a correlatively small thickness, so that complementary equipment such as a fixing and wiring member for a mast sighting device for a military helicopter, for example, can easily be accommodated therein. Lastly, the use of the outer race 20a of the rolling bearing 20 as a rotating disk permits an economical and lightweight production of this member, placed in between the non-rotating disk 3 and the pitch connecting rods 22.

The sole purpose of the reference signs inserted after the technical features mentioned in the claims is to facilitate comprehension of these claims, and in no way limit their scope.

What is claimed is:

1. A device for controlling collective pitch and cyclic pitch of blades of a rotorcraft rotor having a shaft driven in rotation about an axis, said device comprising:
at least one casing rigidly linked to a structure of the rotorcraft rotor;
at least one lower linking member fixed to said at least one casing, said lower linking member including
a) a tubular disk guide mounted coaxially about said shaft of said rotorcraft rotor, and
b) a disk support mounted about said tubular disk guide to slide along said tubular disk guide;
an upper linking member fixed to said shaft;
at least one ball bearing;
two annular disk assembled by said at least one ball bearing, said two annular disk mounted concentrically about said shaft, one of said two annular disks being a non-rotating disk and another of said two annular disks being a rotating disk, said non-rotating disk immobilized in rotation by said at least one lower linking member, said non-rotating disk mounted to be displaceable in an axial translational motion along said tubular disk guide and mounted to oscillate with respect to said shaft via an articulation mechanism about a longitudinal tilting axis and a lateral tilting axis of said two annular disks, said longitudinal and lateral tilting axis being perpendicular to each other, said rotating disk driven in rotation by said shaft by said at least one upper linkage member, said rotating disk connected to a pitch-control lever of each blade of the rotorcraft rotor by at least one pitch connecting rod;
control members controlling displacement in translational motion of the non-rotating disk along said tubular disk guide and controlling oscillation of said non-rotating disk with respect to said shaft; and
said articulation mechanism includes
two swivel joints arranged in diametrically opposite positions in either side of said axis of rotation of said shaft and arranged on either side of said lateral tilting axis and centered on said longitudinal tilting axis, each swivel joint retained between said disk support and said non-rotating disk so that said non-rotating disk oscillates about said longitudinal tilting axis, and
two linking assemblies rigid against torque stresses about said axis of said shaft and deformable in a direction substantially parallel to said axis of said shaft, each linking assembly mounted between respectively one of said swivel joints and said disk support so that said non-rotating disk oscillates about said lateral tilting axis by differential deformations of said two linking assemblies, wherein said rotating disk follows movements of said non-rotating disk and transmits said movements to said pitch-control levers by said pitch connecting rods.

2. The control device as claimed in claim 1, wherein said disk support is tubular and mounted substantially coaxially about said disk guide, and has inner axial splines engaging with outer axial splines of a corresponding shape on said disk guide in order to retain in rotation the disk support without hindering sliding movements of the disk guide which causes simultaneously said disk support and disk guide to immobilize said non-rotating disk in rotation.

3. The control device as claimed in either of claims 1 or 2, wherein each of said linking assemblies comprises at least one laminated block comprising at least one alternating stack of at least one plate of a rigid material and of at least two layers of an elastically deformable material, said laminated block being held between said disk support and an outer cage of the corresponding swivel joint so that, by the deformation of said elastically deformable material, said swivel joint and said outer cage can be displaced in a direction substantially parallel to said axis of rotation and displaced with respect to said disk support, in order to permit the oscillations of said disks about said lateral tilting axis.

4. Control device as claimed in claim 3, wherein said plate and said layer of each alternating stack are retained between an outer rigid armature connected to a retaining lug integral with the disk support, and an inner rigid armature connected to said outer cage of the corresponding swivel joint.

5. The control device as claimed in claim 4, wherein said outer armature has, on a side opposite the corresponding inner armature, a retaining boss engaged in a recess of a threaded member screwed onto said retaining-lug.

6. The control device as claimed in claim 4, wherein said inner armature has, on a side opposite the corresponding outer armature, a shoulder and a tapped part which are arranged on either side of a bearing surface opposite which said outer cage is fixed to the inner armature, being held in abutment with said shoulder by screwing of a threaded member into said tapped part.

7. The control device as claimed in claim 3, wherein each alternating stack is centered on an axis passing through a center of the corresponding swivel joint and perpendicular to a plane defined by the axis of rotation and axis of longitudinal tilting.

8. The control device as claimed in claim 3, wherein each alternating stack comprises rigid plates and deformable layers which are plane and which extend parallel to the plane defined by the axis of rotation and axis of longitudinal tilting so as to permit oscillations of the disks about the lateral tilting axis by shearing of the deformable layers of the laminated blocks.

9. The control device as claimed in claim 3, wherein each linking assembly comprises two alternating stacks, arranged on either side of the corresponding swivel joint and between two retaining lugs projecting on the disk support, on either side of the longitudinal tilting axis.

10. The control device as claimed in claim 9, wherein the two alternating stacks and the two retaining lugs are arranged respectively symmetrically relative to each other with respect to the longitudinal tilting axis, said two retaining lugs extending, moreover, substantially parallel to the longitudinal tilting axis.

11. The control device as claimed in claim 10, wherein said two stacks have outer armatures which constitute two opposite parts of a same outer, rigid tubular piece which envelopes the two stacks of the corresponding linking assembly as well as the corresponding swivel joint and outer cage.

12. The control device as claimed in claim 11, wherein said two stacks have inner armatures which constitute two opposite parts of a same inner, rigid tubular piece, in a central recess of which are housed the corresponding swivel joint and its outer cage, the outer cage being retained against a shoulder projecting toward an inside of the recess by screwing of an externally threaded nut into a tapped end part of said recess.

13. The control device as claimed in claim 2, wherein said outer axial splines extend along an upper section, in a form of a cylinder of circular cross-section, of a said disk guide which comprises a frustoconical lower end part, flared toward said casing and having an outer radial shoulder bolted onto said casing, and a flange for centering on said casing ensuring annular retention of an outer race of a single lift rolling bearing, in which a lower end of the rotor shaft is embedded.

14. The control device as claimed in claim 1, wherein each swivel joint is mounted on a fixing element integrally connected to said non-rotating disk.

15. The control device as claimed in claim 14, wherein the said fixing element comprises a base curved in an arc of a circle, which is applied and fixed against the non-rotating disk, and a radial axle journal which is radial with respect to the axis of rotation and about which said swivel joint is mounted.

16. The control device as claimed in claim 15, wherein each said swivel joint has a central cylindrical bore engaged coaxially with respect to the longitudinal tilting axis, about a bearing surface defined on said radial axle journal between a shoulder and one threaded end of the axle radial journal, wherein the swivel joint is held opposite said bearing surface, being applied in abutment with said shoulder by a nut screwed onto said threaded one end.

17. The control device as claimed in claim 16, wherein said fixing element is fixed by way of the base curved in the arc of the circle against an inner radial face of the non-rotating disk, which is in an inner radial position with respect to each ball bearing and to the rotating disk, and wherein the corresponding radial axle journal extends radially inward and has one threaded end opposite the disk support and in an inner radial position with respect to the shoulder for the swivel joint, while an abutment shoulder for a corresponding outer cage on an inner armature of at least one corresponding stack is in an inner radial position toward the axis of rotation and with respect to a tapped part of said inner armature in which is screwed a threaded member holding said outer cage on said inner armature, a corresponding outer armature being integrally connected to a corresponding retaining lug which projects substantially radially outwards on said disk support.

18. The control device as claimed in claim 1, wherein each upper linking member, intended to drive the rotating disk in rotation with the rotor shaft, is a rotating scissor link assembly articulated on said rotating disk by way of a swivel joint, a center of which, and centers of the swivel joints for tilting of the disks about the longitudinal tilting axis are contained in a same plane defined by the longitudinal tilting axis and the lateral tilting axis.

19. Control device as claimed in claim 1, wherein the at least one pitch connecting rod is articulated on said rotating disk by way of swivel joints, centers of which, and centers of the swivel joints for the tilting of the rotating and non-rotating disks about the longitudinal tilting axis, are contained in a same plane defined by the longitudinal tilting axis and the lateral tilting axis.

* * * * *

UNITED STATES PATENT AND TRADEMARK OFFICE
CERTIFICATE OF CORRECTION

PATENT NO. : 5,199,849
DATED : April 6, 1993
INVENTOR(S) : Leman

It is certified that error appears in the above-indentified patent and that said Letters Patent is hereby corrected as shown below:

On the title page, Item [54] and Column 1, line 2, change "UNCOULDED" to --UNCOUPLED --.

Signed and Sealed this

Twenty-eighth Day of December, 1993

Attest:

BRUCE LEHMAN

Attesting Officer     Commissioner of Patents and Trademarks